US005480702A

United States Patent [19]

Matsumoto et al.

[11] Patent Number: 5,480,702

[45] Date of Patent: Jan. 2, 1996

[54] ARTICLE HAVING INDICIA-RECEIVING LAYER

[75] Inventors: Taiji Matsumoto, Neyagawa; Atsuhiko Suda, Kyoto; Kenji Sumiya, Suita; Yoshinori Yamamoto, Takatsuki, all of Japan

[73] Assignee: Hitachi Maxell, Ltd., Osaka, Japan

[21] Appl. No.: 322,033

[22] Filed: Oct. 13, 1994

Related U.S. Application Data

[63] Continuation of Ser. No. 110,754, Aug. 23, 1993, abandoned, which is a continuation of Ser. No. 829,600, Feb. 3, 1992, abandoned, which is a continuation of Ser. No. 515,350, Apr. 30, 1990, abandoned, which is a continuation of Ser. No. 264,876, Oct. 31, 1988, abandoned.

[30] Foreign Application Priority Data

Oct. 31, 1987 [JP] Japan .................................. 62-276339
Nov. 13, 1987 [JP] Japan .................................. 62-287914

[51] Int. Cl.$^6$ ........................... B32B 27/20; B32B 27/30; B32B 27/40

[52] U.S. Cl. ........................... 428/209; 428/327; 428/328; 428/331; 428/423.7; 428/425.8; 428/463; 428/483; 428/514

[58] Field of Search .................................... 428/209, 327, 428/328, 331, 423.7, 425.1, 425.8, 463, 483, 514, 689, 900

[56] References Cited

U.S. PATENT DOCUMENTS

| | | | |
|---|---|---|---|
| 3,779,800 | 12/1973 | Heiser | 428/327 |
| 4,152,476 | 5/1979 | Stillman | 428/900 |
| 4,223,361 | 9/1980 | Zaitsu et al. | 428/900 X |
| 4,299,882 | 11/1981 | Togawa et al. | 428/329 |
| 4,743,501 | 5/1988 | Eguchi et al. | 428/328 |
| 4,761,338 | 8/1988 | Asano et al. | 428/425.9 |
| 4,778,782 | 10/1988 | Ito et al. | 428/211 |
| 4,794,039 | 12/1988 | Shini | 428/321.3 |

OTHER PUBLICATIONS

European Search Report.

*Primary Examiner*—Jenna L. Davis
*Attorney, Agent, or Firm*—Birch, Stewart, Kolasch & Birch

[57] ABSTRACT

An article comprising a substrate and an indicia-receiving layer on the substrate which comprises a pigment and at least one binder resin selected from the group consisting of vinyl chloride-vinyl acetate copolymers and polyurethane resins is provided.

8 Claims, No Drawings

ARTICLE HAVING INDICIA-RECEIVING LAYER

This application is a continuation of application Ser. No. 08/110,754, filed on Aug. 23, 1993, now abandoned, which was a continuation of Ser. No. 07/829,600, filed on Feb. 3, 1992, now abandoned, which was a continuation of Ser. No. 07/515,350 filed on Apr. 30, 1990, which was a continuation of Ser. No. 07/264,876, filed on Oct. 31, 1988, all now abandoned.

BACKGROUND OF THE INVENTION

1. Field of the Invention

The present invention relates to an article, such as a ticket, a card, a coupon and the like, which has an indicia-receiving layer with good printing characteristics and durability.

2. Description of the Related Art

With the progress of machinization of commercial transactions, magnetic cards having a magnetic layer and also an indicia-receiving layer on which various information such as a money amount, the number of times, a date, etc. are printed are used and set in a reproducing machine to settle accounts.

One example for using such a magnetic card is a ticket vending system, in which an amount of money, the number of times, a date and the like are printed on the indicia-receiving layer formed on a substrate, such as paper, by contacting an ink ribbon onto said layer by means of a printing head at high temperature in a ticket vending machine and then the ticket is sold. Currently, there are two combinations of the indicia-receiving layer and the ink ribbon.

A first combination comprises an indicia-receiving layer which is formed on a substrate, such as paper, by applying a dispersion of a light color inorganic pigment in a binder resin on the substrate and an ink ribbon having an ink layer formed by applying a pigment, such as carbon black or a dye such as nigrosine, dispersed in a wax and the like on a ribbon substrate. In this combination, the pigment or the dye is melt transferred to the indicia-receiving layer by pressing the ink ribbon to the indicia-receiving layer by a heated printing head. A second combination comprises an indicia-receiving layer formed by applying a binder resin which can hold dye molecules on a substrate and an ink ribbon having an ink layer formed from a dispersion of an anthraquinone type disperse dye or an azo disperse dye in a thermoplastic resin, such as polyvinyl alcohol and polyester. In this combination, the ink ribbon is heated by the printing head to evaporate or sublimate the dye and simultaneously to have it penetrate the indicia-receiving layer.

However, both combinations have their own drawbacks. When the indicia-receiving layer of the first combination is repeatedly rubbed in the ticket vending machine or the reproducing machine, it is broken or the thermal transfer ink is scraped. In the second combination, the indicia-receiving layer is discolored or the printed indicia fades due to moisture. Particularly in case where an aqueous emulsion or a water-soluble resin is used as the binder resin, when the card is used with bearing water droplets thereon, the binder resin is gradually deteriorated and finally the indicia penetrated in the indicia-receiving layer becomes illegible.

Neither combination of the indicia-receiving layer and the ink ribbon has satisfactory durability and printing characteristics.

SUMMARY OF THE INVENTION

One object of the present invention is to provide a formulation of a pigment and a binder resin which is suitable for forming an indicia-receiving layer on a thin article, particularly a sheet form article, such as a ticket, a card, a coupon and the like and has improved printing characteristics and durability.

Another object of the present invention is to provide an article, such as a ticket, a card, a coupon and the like, which has an indicia-receiving layer with good printing characteristics and durability.

These and other objects of the present invention are accomplished by providing an article comprising a substrate and an indicia-receiving layer on the substrate which comprises a pigment and at least one binder resin selected from the group consisting of vinyl chloride-vinyl acetate copolymers and polyurethane resins.

DETAILED DESCRIPTION OF THE INVENTION

According to the present invention, as the binder resin, the vinyl chloride-vinyl acetate copolymer and/or the polyurethane resin are used. Among them, a vinyl chloride-vinyl acetate copolymer having from 0.1 to 7% by weight of acrylic hydroxyl groups and a polyurethane resin having aromatic rings (e.g. VAGF (by U.C.C., USA) and Bailon VR 8310 and 8200 (by Toyobo, Japan)) are preferred. Particularly, the vinyl chloride-vinyl acetate copolymer having from 0.1 to 7% by weight of the acrylic hydroxyl groups is less discolored by dehydrogen chloride at high temperatures and has better weather resistance than a vinyl chloride-vinyl acetate-vinyl alcohol copolymer, which is prepared by saponification of the vinyl acetate components to form the hydroxyl groups. Therefore, the indicia-receiving layer comprising the vinyl chloride-vinyl acetate copolymer having from 0.1 to 7% by weight of the acrylic hydroxyl groups as the binder resin does not suffer from deterioration due to moisture, discoloration nor do the mechanical properties deteriorate and the indicia-receiving layer has good weather resistance and improved printing characteristics and durability.

When the vinyl chloride-vinyl acetate copolymer has less than 0.1 by weight of the acrylic hydroxyl groups, the dispersibility of the pigment in the resin is not satisfactory. With the increase of the content of the acrylic hydroxyl groups, the dispersibility of the pigment in the resin is increased. But, when the content of the acrylic hydroxyl groups exceeds 7% by weight, solubility of the resin in a solvent is decreased.

A preferred example of the vinyl chloride-vinyl acetate copolymer having the acrylic hydroxyl groups is one having repeating units of the formula:

$$—(CH_2CHCl)_x—(CH_2CHOCOCH_3)_y—(CH_2CXR)_z—$$

wherein R is a hydrogen, a methyl group or an ethyl group, X is $—CH_2OH$, $—CH(CH_3)OH$, $—COOCH_2OH$, $—COOC_2H_4OH$, $—COOC_3H_6OH$ or $—COOC_4H_8OH$, x is an integer of 220 to 650, y is an integer of 3 to 60 and z is an integer of 2 to 60. Commercially available vinyl chloride-vinyl acetate copolymer having the acrylic hydroxyl groups includes VAGF (Content of the acrylic hydroxyl groups of 1.8% by weight, manufactured by U.C.C, U.S.A.). The vinyl chloride-vinyl acetate copolymer having the acrylic hydroxyl groups may be prepared by a conventional polymerization method such as solution polymerization, suspension polymerization, bulk polymerization and emulsion polymerization. For example, in the solution polymerization, to a reaction vessel, vinyl chloride and vinyl carboxylate are charged together with a polymerization initiator such as benzoyl peroxide, and the mixture is heated to initiate polymerization followed by the addition of an acrylic monomer having the hydroxyl group. In this case, the acrylic monomer having the hydroxyl group is continuously added to the polymerization system as the polymerization proceeds since a copolymer having a homogeneous composition is prepared, although the acrylic monomer may be added to the polymerization system all at once at an initial stage of the polymerization. By controlling an amount of the acrylic monomer having the hydroxyl group, the amount of the acrylic hydroxyl groups in the obtained vinyl chloride-vinyl acetate copolymer can be adjusted. Examples of the vinyl carboxylate are vinyl acetate, vinyl propionate, vinyl versatate, vinyl stearate and the like. Among them, vinyl acetate is preferred. Examples of the acrylic monomer having the hydroxyl group are 2-hydroxyethyl acrylate and methacrylate, 2-hydroxypropyl acrylate and methacrylate, 2-propene-1-ol (allyl alcohol), 2-butene-1-ol (crytyl alcohol), 3-butene-2-ol (methylvinylcarbinol), polyoxyethylene glycol monomethacrylate, polyoxypropylene glycol monomethacrylate and the like. Among them, 2-hydroxypropyl methacrylate is preferred.

Because of the presence of the aromatic rings, the preferably used polyurethane resin having the aromatic rings has stiff molecule chains and an increased glass transition temperature. Since such polyurethane resin is stiff but flexible, the indicia-receiving layer comprising such polyurethane resin is less sticky and has improved durability. Although conventionally used polyester resins have good printing characteristics, such characteristics are greatly changed with time, and the resin is very sticky at high temperatures and has poor durability against repeated use.

Preferably, the polyurethane resin contains the aromatic rings in an amount of from 0.05 to 6.0 mmol/g. When the aromatic ring content is too small, the glass transition temperature of the resin is decreased so that the tackiness is increased. When the aromatic ring content is too large, solubility of the resin in the solvent is decreased.

Examples of a polyurethane resin having the aromatic rings are polyurethane resins prepared from an isocyanate component, such as methylenediisocyanate, and a polyester component, such as isophthalic acid, terephthalic acid, adipic acid, neopentyl glycol, caprolactone, hexanediol and the like. Commercially available products include UR 8200 (aromatic ring content of 4.5 mmol/g) and UR 8300 (aromatic ring content of 3.4 mmol/g) both manufactured by Toyoho Kabushikikaisha, Japan. Such polyurethane resin may be prepared by a conventional method comprising charging an acid component (e.g. dimethyl isophthalate, dimethyl terephthalate, adipic acid, sebacic acid, azelaic acid, etc.), a polyol component (e.g. hexanediol, ethylene glycol, 1,4-heptanediol, neopentyl glycol, polyethylene glycol, etc.) and optionally dimethyl 5-sodiumsulfoisophthalate in a reactor equipped with a thermometer, a stirrer and a partially refluxing condenser followed by the addition of zinc acetate, sodium acetate or antimony trioxide to proceed transesterification at a temperature of 140° to 220° C. for about 3 hours, then adding polycaprolactone diol to the resulting polyesterpolyol and further adding diphenylmethane diisocyanate and dibutylin laurate together with methyl ethyl ketone, and heating the reaction mixture at a temperature of 70° to 80° C. for about 8 hours to obtain the desired polyurethane resin having the aromatic rings.

The vinyl chloride-vinyl acetate copolymer and the polyurethane resin may be used independently or in combination. When they are used in combination, the copolymer and the polyurethane are used preferably in a weight ratio of 2:8 to 8:2.

The binder resin may optionally contain an isocyanate compound. When the isocyanate compound is contained in the binder resin, the hydroxyl groups of the vinyl chloride-vinyl acetate copolymer and the isocyanate group of the isocyanate compound are cross linked so that the strength and durability of the indicia-receiving layer is further increased. As the isocyanate compound, a trifunctional one, such as Colonate L (manufactured by Nippon Polyurethane), is preferably used. The isocyanate compound is used preferably in an amount of from 5 to 30 % by weight based on the total weight of the binder resin in the indicia-receiving layer.

As the pigment to be dispersed in the binder resin, light pigments are preferably used to achieve clear visibility when the indicia are marked on the indicia-receiving layer by melt transferring the ink layer formed on the ink ribbon from the dispersion of a pigment, such as carbon black, or a dye, such as nigrosine, in a wax with the heated printing head. Among the pigments, $SiO_2$, $TiO_2$ and their mixture are preferred. $SiO_2$ and $TiO_2$ have good affinity with the vinyl chloride-vinyl acetate copolymer and the polyurethane resin and also with the wax to be used as a binder resin for preparing the ink ribbon. When the $SiO_2$ and $TiO_2$ are used together with the vinyl chloride-vinyl acetate copolymer and the polyurethane resin, the indicia-receiving layer has excellent printing characteristics and durability. To adjust surface roughness of the indicia-receiving layer and increase the printing characteristics, $SiO_2$ preferably has a secondary particle size in a range from 0.1 to 20.0 μm. When the secondary particle size of $SiO_2$ is too small, contrast between the background of the indicia-receiving layer and the indicia is decreased, and when it is too large, touch is slightly worsened. The amount of the light inorganic pigment to be used is from 20 to 50% by weight based on the binder resin contained in the indicia-receiving layer. When the amount is less than 20% by weight, the contrast between a background of the indicia-receiving layer and the indicia is decreased. An amount larger than 50% by weight is not necessary.

When the indicia are printed on the indicia-receiving layer by contacting the ink ribbon having the ink layer containing the anthraquinone type disperse dye or the azo disperse dye dispersed in the thermoplastic resin with the heated printing head to sublimate or evaporate the dye onto the indicia-receiving layer and have the dye penetrate the layer, the pigment in the indicia-receiving layer should have good penetrability with respect to the dye and will hold the dye molecules, and also has good transparency so that printed marks which are often formed beneath the indicia-receiving layer can be seen through the indicia-receiving layer. In this case, as the pigment, organic resin fine particles are preferably used since they have good penetrability by the dye, the capability for holding the dye molecules after heating is stopped and good transparency, in addition to an inherent property for reinforcing the layer. Examples of such organic resin fine particles are fine particles of cross linked polystyrene, cross linked polyvinyl chloride, cross linked polymethyl methacrylate and the like. These organic resin fine particles have good affinity with the vinyl chloride-vinyl acetate copolymer and the polyurethane resin. When such organic resin fine particles are used in combination with the vinyl chloride-vinyl acetate copolymer or the polyurethane resin, the former fine particles are well dispersed in the latter copolymer or resin so that the penetrability of the dye and the holding property of the dye molecules are desirably realized. Therefore, the indicia-receiving layer has good printing property and durability. To these ends, preferably the organic resin fine particles have an average particle size of from 0.1 to 20.0 μm. An amount of the organic resin fine particles to be used is from 1 to 40% by weight based on the weight of the binder resin in the indicia-receiving layer.

As the dyes to be used in the above printing system, those having a sublimation property, such as anthraquinone type disperse dyes, azo disperse dyes, direct dyes, and dyes soluble in an organic solvent are exemplified. Specific examples of such dyes are disperse dyes (e.g. C.I. Disperse Yellow 1, C.I. Disperse Orange 3, C.I. Disperse Red 5, C.I. Disperse Orange 5, C.I. Disperse Red 4, C.I. Disperse Violet 4, C.I. Disperse Blue 3, C.I. Disperse Blue 1, C.I. Disperse Blue 7, C.I. Disperse Black 1, C.I. Disperse Black 3, etc.), TS Yellow 103, Miketon Fast Brilliant Blue B (a disperse dye manufactured by Mitsui Chemical), Sumilight Blue OA (a direct dye manufactured by Sumitomo Chemical), Sumilight Blue FC (a direct dye manufactured by Sumitomo Chemical), Sumilight Blue S35 (a direct dye manufactured by Sumitomo Chemical), Kayaset Blue 136 (an organic solvent soluble dye manufactured by Nippon Kayaku) and the like. Further, suitable dyes are listed in "Senryobinran" (Dye Handbook) published by Maruzen in July, 1970.

Preferred examples of the binder resin to be used to form the ink layer are cellulose resins (e.g. cellulose acetate, ethyl cellulose, hydroxyethyl cellulose, ethyl hydroxy cellulose, hydroxypropyl cellulose, methyl cellulose, etc.), vinyl resins (e.g. polyvinyl alcohol, polyvinyl acetate, polyvinyl butyral, polyvinylpyrolidone, etc.), polyester, polyacrylamide and the like.

The ink layer may be formed by dispersing the dye and the binder resin in an organic solvent, such as toluene, methyl isobutyl ketone and dioxane, to prepare an ink layer paint and coating the paint on an ink ribbon substrate followed by drying.

The indicia-receiving layer containing the above described pigment may be formed by mixing the pigment, the binder resin and other optional components in an organic solvent to prepare an indicia-receiving layer paint and coating the paint on a substrate followed by drying.

As a substrate material, paper, a plastic film such as a polyester film and a polyamide film, a metal foil and the like are used.

Any organic solvent in which the binder resin can be dissolved may be used. Examples of the organic solvent are cyclohexanone, methyl isobutyl ketone, methyl ethyl ketone, ethyl acetate, toluene, tetrahydrofuran, dioxane and mixtures thereof.

Since an extremely large sliding contact force may be applied on the indicia-receiving layer during writing and reading data by a reading and writing machine, a solid lubricant is preferably contained in the indicia-receiving layer. As the solid lubricant, crystalline minerals with layered structure and organic compounds are preferably used. Among them, metal salts of fatty acid, particularly zinc stearate are preferred. The solid lubricant is used in an amount of from 0.1 to 10% by weight based on the weight of the binder resin in the indicia-receiving layer.

Although the above explanation has been made in relation with heat transfer printing, the same effects can be achieved in wire dot printing or ink jet printing by forming the indicia-receiving layer comprising the pigment and the above described vinyl chloride-vinyl acetate copolymer and/or the polyurethane resin.

After the formation of the indicia-receiving layer, the substrate is cut to a desired form such as a card. Then, any mark such as a bar code is printed on the card by means of the ink ribbon and the printing head. The card bearing the bar code can be used, for example, for settling the account by optically identifying the bar code. When a magnetic recording layer is also formed on the substrate together with the indicia-receiving layer, such a card can be more conveniently used as a magnetic card. In such a case, the indicia-receiving layer and the magnetic layer may be formed on the substrate in various patterns. For example, both layers can be formed on one side of the substrate, or one is formed on one side and the other on the other side. Each layer can be formed on the substrate independently, or one layer is formed on the other layer. The layers may be formed on the whole or parts of surface of the substrate.

When the indicia-receiving layer and the magnetic layer are both formed on the substrate, the magnetic layer may be formed by any conventional method. For example, a magnetic paint containing magnetic powder, a binder resin, an organic solvent and other optional components is applied on the suitable area of the substrate surface adjacent to the area on which the indicia-receiving layer is formed, and drying the paint.

As the magnetic powder, any conventional magnetic powder is widely used. Examples of the magnetic powder are $\gamma$-$Fe_2O_3$ powder, $Fe_3O_4$ powder, cobalt-containing $\gamma$-$Fe_2O_3$ powder, cobalt-containing $Fe_3O_4$ powder, $CrO_2$ powder, Fe metal powder, Co metal powder, Fe-Ni alloy powder, barium ferrite powder and the like.

As the binder resin in the magnetic layer, any of the conventional ones may be used. Examples of the binder resin are vinyl chloride-vinyl acetate resin, cellulose resin, polyvinyl butyral resin, polyester resin, polyurethane resin, isocyanate compounds and the like.

As the organic solvent, one in which the binder resin is soluble is used, and the same kinds of solvents as used for the formation of the indicia-receiving layer may be used.

PREFERRED EMBODIMENTS OF THE INVENTION

The present invention will be illustrated by the following Examples in which parts and percentages are by weight.

EXAMPLE 1

The following components were mixed and dispersed in a ball mill for 5 hours to form an indicia-receiving layer paint:

| Component | Parts |
|---|---|
| Vinyl chloride-vinyl acetate-vinyl alcohol copolymer having the acrylic hydroxyl groups (VAGF manufactured by U.C.C., U.S.A., OH content, 1.8%) | 30 |
| Polyurethane resin having the aromatic rings (UR-8200 manufactured by Toyobo, Aromatic ring content, 4.52 mmol/g) | 30 |
| $SiO_2$ (Average secondary particle size, 2.8 μm) (Carplex CS-701 manufactured by Shionogi, Japan) | 30 |
| $TiO_2$ (Taipake CR-50 manufacture by Ishihara Industries) | 10 |
| Cyclohexanone | 200 |
| Toluene | 200 |

The prepared indicia-receiving layer paint was coated on a part of a white polyester film having a thickness of 188 μm and an O.D. value of 0.05 measured by a reflection densitometer (manufactured by Macbeth) and dried to form an indicia-receiving layer having a width of 20 mm and a dry thickness of 8 μm.

Separately, a magnetic paint was prepared by mixing the following components by a ball mill for 50 hours:

| Component | Parts |
|---|---|
| Co-containing $\gamma$-$Fe_2O_3$ powder | 100 |
| Vinyl chloride-vinyl acetate-vinyl alcohol copolymer (VAGH manufacture by U.C.C.) | 10 |
| Polyurethane elastomer (N-2304 manufactured by Nippon Polyurethane) | 10 |
| Trifunctional low molecular weight isocyanate compound (Colonate L manufactured by Nippon Polyurethane) | 5 |
| Carbon black | 3 |
| Methyl ethyl ketone | 120 |
| Toluene | 120 |

The prepared magnetic paint was coated on a part of the white polyester film adjacent to the part on which the indicia-receiving layer had been formed and dried to form a magnetic layer having a width of 10.1 mm and a dry thickness of 12 μm.

The polyester film bearing the indicia-receiving layer and the magnetic layer was cut to a desired size and shape to produce a card.

EXAMPLE 2

In the same manner as in Example 1 but using 60 parts of the vinyl chloride-vinyl acetate-vinyl alcohol copolymer (VAGF) instead of 30 parts and no polyurethane resin having the aromatic rings in the preparation of the indicia-receiving layer paint, the indicia-receiving layer and the magnetic layer were formed on the film and the card was produced.

EXAMPLE 3

In the same manner as in Example 1 but using 40 parts of $SiO_2$ instead of 30 parts and no $TiO_2$ in the preparation of the indicia-receiving layer paint, the indicia-receiving layer and the magnetic layer were formed on the film and the card was produced.

EXAMPLE 4

In the same manner as in Example 1 but using 60 parts of the polyurethane resin having the aromatic rings instead of 30 parts, 40 parts of $SiO_2$ instead of 30 parts, no vinyl chloride-vinyl acetate-vinyl alcohol copolymer and no $TiO_2$ in the preparation of the indicia-receiving layer paint, the indicia-receiving layer and the magnetic layer were formed on the film and the card was produced.

EXAMPLE 5

In the same manner as in Example 1 but using 60 parts of the vinyl chloride-vinyl acetate-vinyl alcohol copolymer instead of 30 parts, 40 parts of $SiO_2$ instead of 30 parts, no polyurethane resin having the aromatic rings and no $TiO_2$ in the preparation of the indicia-receiving layer paint, the indicia-receiving layer and the magnetic layer were formed on the film and the card was produced.

EXAMPLE 6

In the same manner as in Example 1 but forming no magnetic layer, the card was produced.

EXAMPLE 7

In the same manner as in Example 2 but forming no magnetic layer, the card was produced.

EXAMPLE 8

In the same manner as in Example 3 but forming no magnetic layer, the card was produced.

EXAMPLE 9

In the same manner as in Example 4 but forming no magnetic layer, the card was produced.

EXAMPLE 10

In the same manner as in Example 5 but forming no magnetic layer, the card was produced.

EXAMPLE 11

In the same manner as in Example 1 but using 40 parts of the vinyl chloride-vinyl acetate-vinyl alcohol copolymer instead of 30 parts, 40 parts of the polyurethane resin having the aromatic rings instead of 30 parts, no $SiO_2$ and no $TiO_2$ and using 10 parts of cross linked polystyrene fine particles (Fine Pearl PB-3006 E having an average particle size of 6 μm manufactured by Sumitomo Chemical) and 0.1 part of zinc stearate in the preparation of the indicia-receiving layer paint, the indicia-receiving layer and the magnetic layer were formed on the film and the card was produced.

EXAMPLE 12

In the same manner as in Example 11 but using no zinc stearate, the indicia-receiving layer and the magnetic layer were formed on the film and the card was produced.

EXAMPLE 13

In the same manner as in Example 11 but using no polyurethane resin having the aromatic rings and 80 parts of the vinyl chloride-vinyl acetate-vinyl alcohol copolymer instead of 40 parts in the preparation of the indicia-receiving layer paint, the indicia-receiving layer and the magnetic layer were formed on the film and the card was produced.

EXAMPLE 14

In the same manner as in Example 11 but using no vinyl chloride-vinyl acetate-vinyl alcohol copolymer and 80 parts of the polyurethane resin having the aromatic rings instead of 40 parts in the preparation of the indicia-receiving layer paint, the indicia-receiving layer and the magnetic layer were formed on the film and the card was produced.

EXAMPLE 15

In the same manner as in Example 12 but using the same amount of cross linked polymethyl methacrylate fine particles (MP-3100 having an average particle size of 0.4 μm manufactured by Soken Chemical) in place of the cross linked polystyrene particles in the preparation of the indicia-receiving layer, the indicia-receiving layer and the magnetic layer were formed on the film and the card was produced.

EXAMPLE 16

In the same manner as in Example 11 but forming no magnetic layer, the card was produced.

COMPARATIVE EXAMPLE 17

In the same manner as in Example 9 but using the same amount of a polyurethane resin having no aromatic rings (Pandex T-5201 manufactured by Dainippon Ink and Chemical) in place of the polyurethane resin having the aromatic rings in the preparation of the indicia-receiving layer paint, the indicia-receiving layer and the magnetic layer were formed on the film and the card was produced.

COMPARATIVE EXAMPLE 18

In the same manner as in Example 10 but using the same amount of a vinyl chloride-vinyl acetate-vinyl alcohol copolymer having no acrylic hydroxyl groups (VAGH manufactured by U.C.C.) in place of the vinyl chloride-vinyl acetate-vinyl alcohol copolymer having the acrylic hydroxyl groups in the preparation of the indicia-receiving layer paint, the indicia-receiving layer and the magnetic layer were formed on the film and the card was produced.

COMPARATIVE EXAMPLE 19

In the same manner as in Example 14 but using the same amount of the polyurethane resin having no aromatic rings (Pandex T-5201) in place of the polyurethane resin having the aromatic rings, no polystyrene particles and no zinc stearate in the preparation of the indicia-receiving layer paint, the indicia-receiving layer and the magnetic layer were formed on the film and the card was produced.

COMPARATIVE EXAMPLE 20

In the same manner as in Example 13 but using the same amount of a vinyl chloride-vinyl acetate-vinyl alcohol copolymer having no acrylic hydroxyl groups (VAGH) in place of the vinyl chloride-vinyl acetate-vinyl alcohol copolymer having the acrylic hydroxyl groups, no polystyrene particles and no zinc stearate in the preparation of the indicia-receiving layer paint, the indicia-receiving layer and the magnetic layer were formed on the film and the card was produced.

COMPARATIVE EXAMPLE 1

In the same manner as in Example 9 but using a polyester resin (Vilon 200 manufactured by Toyobo) in place of the polyurethane resin having the aromatic rings, the indicia-receiving layer was formed and the card was produced.

COMPARATIVE EXAMPLE 2

In the same manner as in Example 14 but using the same amount of the polyester resin (Vilon 200) in place of the polyurethane resin having the aromatic rings and no zinc stearate, the indicia-receiving layer was formed and the card was produced.

With each of the cards prepared in Examples and Comparative Examples, durability and printing characteristics of the indicia-receiving layer were examined.

The durability of the indicia-receiving layer was examined by reciprocally sliding a magnetic head on the surface of the card at a rate of 150 mm/sec. under a load of 500 g at 45° C. and 90% RH, and counting the number of reciprocal sliding till the indicia-receiving layer.

The printing characteristics were examined by thermally transferring characters on the indicia-receiving layer and then reciprocally sliding a magnetic head on the surface of the card at a rate of 150 mm/sec. under a load of 500 g and counting the number of reciprocal sliding till the indicia became unclear.

As an ink ribbon used for printing, one having an ink layer comprising carbon black dispersed in a wax binder was used for the cards produced in Examples 1–10 and Comparative Examples 1–2, or one having an ink layer comprising an azo disperse dye, C.I. Disperse Black 1 (Sumikalon Diazoblack B manufactured by Sumitomo Chemical) dispersed in polyvinyl alcohol resin was used for the cards produced in Examples 11–20, and the characters were printed by means of a thermal head of 8 dots/mm with applying electric powder of 0.8 mJ/dot.

Just after the production of the card or after keeping the card at 60° C. for 1,000 hours, a whiteness degree of the indicia-receiving layer was measured by means of the reflection densitometer (manufactured by Macbeth). The "whiteness degree" means an optical density (O.D.) value measured by the reflection densitometer, and the smaller value indicates better whiteness.

TABLE 1

| | | Printing characte- | Whiteness degree (O.D. value) | |
|---|---|---|---|---|
| Example No. | Durability (Number) | ristics (Number) | Just after production | After 1,000 hrs at 60° C. |
| 1 | 2,920 | 1,570 | 0.08 | 0.13 |
| 2 | 2,330 | 1,560 | 0.07 | 0.11 |
| 3 | 2,990 | 1,490 | 0.09 | 0.15 |
| 4 | 2,330 | 1,510 | 0.09 | 0.19 |
| 5 | 2,300 | 1,530 | 0.07 | 0.10 |
| 6 | 2,950 | 1,590 | 0.09 | 0.14 |
| 7 | 2,320 | 1,570 | 0.08 | 0.11 |
| 8 | 2,970 | 1,510 | 0.09 | 0.14 |
| 9 | 2,340 | 1,490 | 0.09 | 0.20 |
| 10 | 2,290 | 1,560 | 0.07 | 0.10 |
| 17 | 1,530 | 920 | 0.10 | 0.34 |
| 18 | 2,190 | 1,620 | 0.08 | 1.10 |
| Com. 1 | 1,120 | 560 | 0.09 | 0.30 |

TABLE 2

| | | Printing characte- | Whiteness degree (O.D. value) | |
|---|---|---|---|---|
| Example No. | Durability (Number) | ristics (Number) | Just after production | After 1,000 hrs at 60° C. |
| 11 | 5,120 | 5,110 | 0.11 | 0.14 |
| 12 | 5,010 | 5,000 | 0.10 | 0.12 |
| 13 | 5,060 | 5,045 | 0.12 | 0.13 |
| 14 | 5,050 | 5,040 | 0.10 | 0.15 |
| 15 | 5,060 | 5,050 | 0.10 | 0.13 |
| 16 | 5,130 | 5,110 | 0.11 | 0.13 |
| 19 | 4,360 | 4,340 | 0.14 | 0.47 |
| 20 | 4,450 | 4,430 | 0.10 | 0.56 |
| Com. 2 | 3,570 | 3,560 | 0.11 | 0.46 |

As understood from the results of Tables 1 and 2, in comparison with the cards produced in Comparative Examples, the cards produced according to the present invention (Examples 1–20) have longer durability (larger number of slidings till breakage), better printing characteristics, higher whiteness degree, and the good thermal resistance of whiteness. These results mean that the cards according to the present invention has better durability and printing characteristics.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An information receptive article which receives an indicia made by an ink containing a pigment and a binder resin by thermal transfer printing to which a sliding contact force is applied by a reading and writing machine, said article comprising a substrate and an indicia receiving layer formed on at least one surface of said substrate which layer comprises a pigment and a binder resin which consists essentially of a blend of (1) a copolymer of vinyl chloride, vinyl acetate and an acrylic monomer having a hydroxyl group, said copolymer having from 0.1 to 7.0% by weight of acrylic hydroxyl groups to enhance dispersability and (2) a polyurethane resin with aromatic rings in an amount of from 0.05 to 6.0 mmol/g to increase stiffness, decrease stickiness and increases durability of said indicia image thermally transferred to said indicia-receiving layer.

2. The article according to claim 1, wherein said pigment is a light pigment to achieve clear visibility and is contained in an amount of from 20 to 50% by weight based on the weight of the binder resin.

3. The article according to claim 2, wherein said light pigment is selected from at least one member of the group consisting of $SiO_2$ and $TiO_2$.

4. The article according to claim 3, wherein said light pigment is a mixture of $SiO_2$ and $TiO_2$.

5. The article according to claim 3, wherein said $SiO_2$ has an average secondary particle size of 0.1 to 20.0 μm.

6. The article according to claim 1, wherein said indicia-receiving layer further comprises a solid lubricant.

7. The article according to claim 6, wherein said solid lubricant is a metal salt of a fatty acid.

8. The article according to claim 1, which further includes a magnetic layer formed on said substrate.

* * * * *